UNITED STATES PATENT OFFICE.

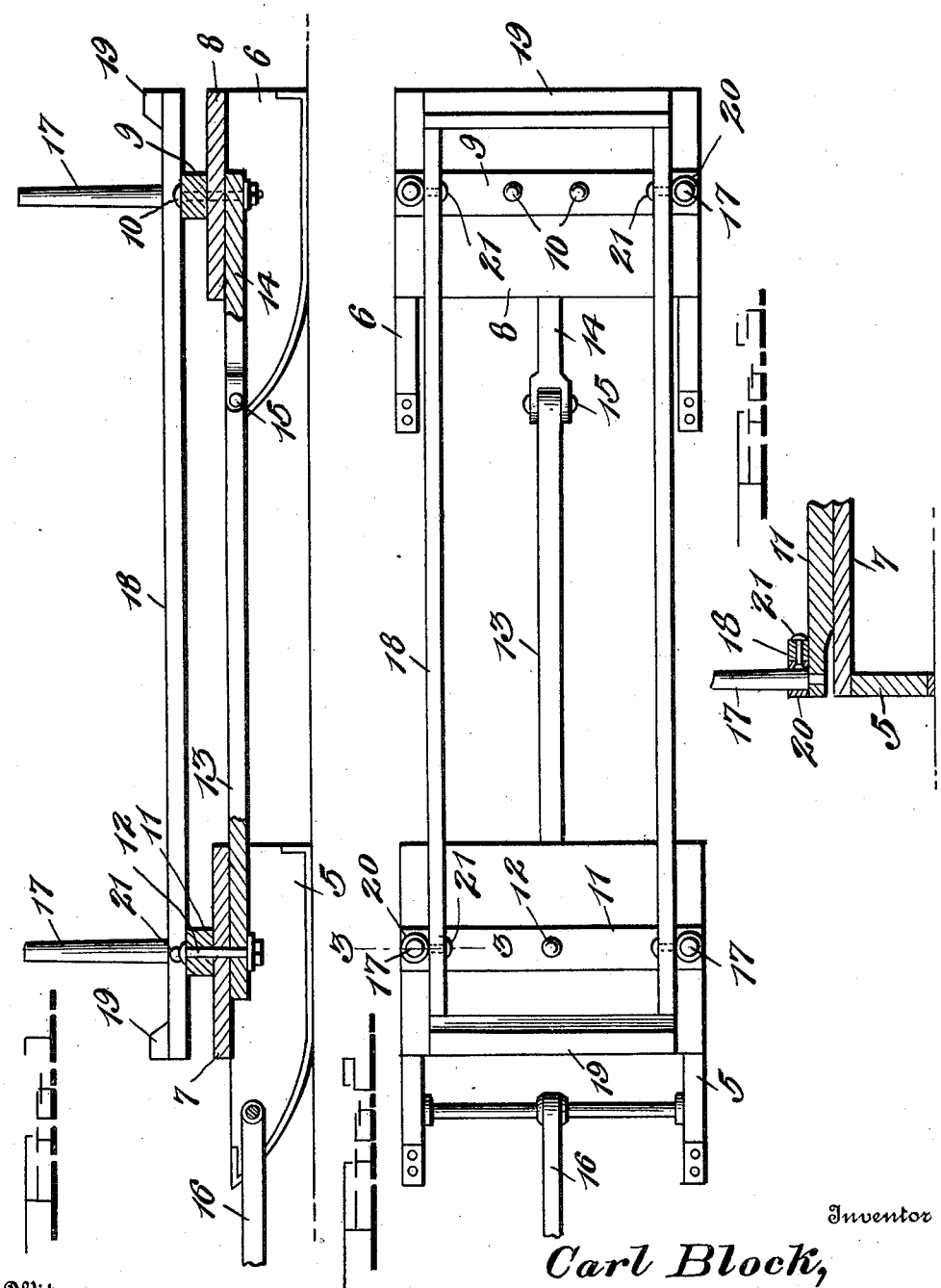

CARL BLOCK, OF PLATO, MINNESOTA.

HAULING-SLED.

1,029,661. Specification of Letters Patent. Patented June 18, 1912.

Application filed September 30, 1911. Serial No. 652,050.

*To all whom it may concern:*

Be it known that I, CARL BLOCK, a citizen of the United States, residing at Plato, in the county of McLeod and State of Minnesota, have invented certain new and useful Improvements in Hauling-Sleds, of which the following is a specification, reference being had to the accompanying drawings.

This invention relates to hauling sleds and has for its object to provide a bob sled of improved construction, and means for mounting a rack thereon whereby the front sled runners may move vertically or laterally with respect to the rear runners without danger of upsetting the load.

A further object of the invention resides in the provision of a hauling sled of the above character which consists of comparatively few parts and may therefore be inexpensively manufactured and is also extremely efficient and highly durable in practical use.

With the above and other objects in view, the invention consists of the novel features of construction, combination and arrangement of parts hereinafter fully described and claimed, and illustrated in the accompanying drawings, in which—

Figure 1 is a longitudinal section of a hauling sled constructed in accordance with my invention; Fig. 2 is a top plan view; and Fig. 3 is a detail transverse section taken on the line 3—3 of Fig. 2.

Referring in detail to the drawing 5 designates the front runners and 6 the rear runners of my improved sled. These runners are arranged in pairs in the usual manner and the runners of each pair are connected by the top boards 7 and 8 respectively. A bolster 9 is transversely arranged upon the rear top board 8 and is rigidly secured thereto by means of the bolts 10. A similar bolster 11 is arranged upon the upper surface of the front body board 7 and is pivotally secured thereon by means of the king bolt 12 which passes centrally therethrough and through the top board. This bolt also connects the forward end of the reach bar 13 to the body or top board of the forward runners so that said runners may move laterally with respect thereto in the turning of the sled. The reach bar consists of two sections, the rear section 14 thereof being shorter than the forward section and rigidly secured to the under side of the rear body board 8. These reach bar sections are pivotally connected as indicated at 15 so that the front pair of runners may move in a vertical plane with relation to the rear runners when the machine passes over a broken or uneven grade surface. To the forward ends of the front runners 5 suitable draft connections 16 are adapted to be attached. The foregoing description of parts constitutes the sled construction and I will now proceed with the description of the loading rack and the manner in which the same is mounted upon the sled.

Upon the ends of each of the bolsters 9 and 11 the perpendicular stakes 17 are arranged and rigidly fixed thereto at their lower ends. The loading rack consists of the parallel longitudinal bars 18 which are connected at their ends by means of the cross bars 19. This rack is of sufficient length to extend forwardly and rearwardly of the bolsters 11 and 9 respectively and the bars 18 are provided upon their outer faces and adjacent to their ends with the sleeves 20. These sleeves are connected to the bars 18 by means of the pivot bolts 21 and are adapted to turn freely on said bolts. It will thus be seen that when the forward runners 5 enter a hollow or encounter an obstruction in the roadway, they will move vertically with respect to the rear runners, the forward reach bar section swinging upon the pivot 15. The front end of the rack will be lowered or elevated as the case may be and in such movement the stakes 17 are relieved of all strain and liability of the rack moving longitudinally and dumping its load is entirely obviated. The stakes 17 preferably taper longitudinally so that the rack may be easily and quickly removed when desired.

From the foregoing it is believed that the construction and manner of operation of my improved loading sled will be fully understood. The sled is admirably adapted for the hauling of logs or other heavy articles, for which purpose a sled of great strength and durability is necessary. Owing to the great weight of the logs, the rack supporting stakes often become broken so that considerable time and labor must be expended in reloading the sled with the logs. By means of my construction the stakes are relieved to a great extent of all unnecessary strain in the movement of the sled over the ground so that a maximum of durability is obtained. Owing to the simplicity of the device it will also be obvious that the sled can be manufactured at a comparatively small cost.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. The combination with a sled and stakes carried thereby, of a rack mounted upon the sled, and means pivotally connecting the rack to said stakes.

2. The combination with a sled and stakes carried thereby, of a rack mounted upon the sled, and means pivotally secured to the rack and removably engaged upon said stakes.

3. The combination with a sled and stakes carried thereby, of a rack mounted upon said sled, and means carried by the rack and engaging said stakes to permit of the movement of the sled in a vertical plane with relation to the rack.

4. The combination with a sled including spaced bolsters and stakes secured upon the ends of said bolsters, of a rack extending at its ends between the stakes on the respective bolsters, and sleeves pivotally secured to the rack and removably engaged upon said stakes.

In testimony whereof I hereunto affix my signature in the presence of two witnesses.

CARL BLOCK.

Witnesses:
Geo. Minder,
M. A. Bell.

Copies of this patent may be obtained for five cents each, by addressing the "Commissioner of Patents, Washington, D. C."